United States Patent
Hull

[11] 3,900,167
[45] Aug. 19, 1975

[54] CLOSED FACE SPINNING REEL

[76] Inventor: R. Dell Hull, 6101 E. Appache St., Tulsa, Okla. 74101

[22] Filed: June 17, 1974

[21] Appl. No.: 479,633

[52] U.S. Cl. .................. 242/84.2 A; 242/84.5 A
[51] Int. Cl.² .................. A01K 89/00; A01K 89/02
[58] Field of Search... 242/84.2 A, 84.2 R, 84.21 A, 242/84.21 R, 84.2 E, 84.2 F, 84.2 G, 84.5 R, 84.5 A, 84.51 R, 84.51 A

[56] References Cited
UNITED STATES PATENTS

| | | | |
|---|---|---|---|
| 2,719,680 | 10/1955 | Denison et al. | 242/84.2 A |
| 2,964,257 | 12/1960 | Hull | 242/84.2 A X |
| 3,088,691 | 5/1963 | Hull | 242/84.5 A |
| 3,175,781 | 3/1965 | Maury et al. | 242/84.2 A |
| 3,198,456 | 8/1965 | Wood | 242/84.2 A |
| 3,521,830 | 7/1970 | Hull | 242/84.2 A |

*Primary Examiner*—Billy S. Taylor
*Attorney, Agent, or Firm*—Mandeville and Schweitzer

[57] ABSTRACT

The disclosure herein relates to closed face spinning reels, and it is directed more specifically to several unique structural improvements in closed face spinning reels, including a star wheel controlled bell crank for selectively adjusting the "drag" or clutching pressure applied to a normally non-rotatable line spool through a leaf spring drag brake lever pivotably mounted on the central reel frame. The ends of the bell crank are in the form of camming surfaces, one of which is engaged by the inner face of the star wheel and the other of which engages the end of the drag brake lever. Controlled pivoting of the bell crank in a first direction caused by rotation of the star wheel in a first direction effects a selective increase in the braking pressure applied to the line spool and vice versa. Additionally, the reel includes an improved housing assembly in which two cup-shaped covers abut and cooperate to define two, shouldered lock screw openings which receive the shank of and are engaged and secured to the reel frame by annular locking flanges formed on the peripheral underside of the heads of the lock screws. These new structural arrangements for closed face spinning reels enhance and simplify the operation thereof, accommodate the use of readily available metallic materials of construction, simplify the manufacture of the components, and simplify the assembly thereof in the mass production of closed face spinning reels.

6 Claims, 5 Drawing Figures

PATENTED AUG 19 1975 3,900,167

CLOSED FACE SPINNING REEL

BACKGROUND AND SUMMARY OF THE INVENTION

Closed face fishing reels are well known to the art and have been manufactured in large quantities at comparatively low cost for many years in a variety of embodiments. Representative of the earlier reels and the well developed and rather crowded state of the art are the many U.S. patents issued to R. D. Hull, including among many others U.S. Pat. Nos. 2,541,360; 2,668,025; 2,675,193; 2,964,257; 3,020,666; 3,059,873; 3,088,691; 3,185,405; 3,469,799; 3,481,554; and 3,552,674.

Closed face spinning reels of the type contemplated herein typically include a normally non-rotatable line spool from which fishing line is paid out and retrieved by an appropriate pickup element rotated by a crank mechanism geared thereto; a line brake to hold the line during the initial phases of casting; a drag brake mechanism to permit controlled payout of the line by rotation of the line spool when an undue pressure is exerted thereon by a hooked fish; an anti-reverse mechanism to prevent the rotation of the crank handle in the payout direction; and a closed face housing completely enveloping the reel mechanism and including a thumb button for actuating the line brake and preparing the internal mechanism for casting.

In one type of closed face spinning reel, a line carrying spool is normally non-rotatably mounted on a hub which projects forwardly from a reel frame. The line spool is axially fixed and normally non-rotatable; however, provision is made for limited rotary slippage or drag of the spool relative to the reel frame for controlled withdrawal of line from the spool. During casting, the line is drawn off and over the spinner head of the spool by the momentum of the lure and travels through a line guide in a cover generally surrounding the spool.

Retrieval of paid out fishing line may be effected in reels of this type by a cup-shaped spinner head mounted on a rotatable main shaft carried by the reel frame and driven by a crankshaft appropriately geared therewith. Advantageously, the spinner head of such a reel includes a rearwardly directed flange having notched, line engaging edges and mounting a line brake ring on its forwardly facing surfaces. Typically, the reel also includes a crank assembly to effect the necessary rotation of the main shaft to retrieve paid out line. Advantageously, a selectively actuatable anti-reverse mechanism is also included in the reel to prohibit rotation of the retrieval mechanism in a line payout direction. The line brake is actuated by a thumb button to clamp the line between the brake ring and cover housing preparatory to casting and also to displace the spinner head into a position in which the aforementioned notches are non-interfering with line payout.

The aforementioned basic closed face reel components have taken a variety of shapes, forms and structures in the constructions of the prior art. However, there are certain improvements therein in the nature of simplification and/or rearrangement of parts which, advantageously, lead to a reduction in manufacturing expense, a simplification of assembly and use of a closed face spinning reel, and an enhancement of reel reliability and response.

In accordance with the present invention, a star wheel controlled bell crank is provided for selectively adjusting the drag or clutching pressure applied to the normally non-rotatable line spool. Brake pressure is applied through a leaf spring drag brake lever pivotably mounted on the central reel frame. The ends of the bell crank are in the form of camming surfaces, one of which is engaged by the inner face of the star wheel and the other of which engages the end of the drag brake lever. Controlled pivoting of the bell crank in a first direction, caused by rotation of the star wheel in a first direction, effects a selective increase in the braking pressure applied to the line spool and vice versa. In accordance with the invention, the new reel further includes an improved housing assembly in which two cup-shaped covers abut and cooperate to define two, shouldered lock screw openings which receive the shank of and are engaged and secured to the reel frame by annular locking flanges formed on the peripheral undersides of the heads of the lock screws.

For a more complete understanding of the reel of the present invention and a greater appreciation of its attendant advantages derived from its specific structural features, reference should be made to the following detailed description of the new closed face reel, taken in conjunction with the accompanying drawings, which are illustrative of a preferred embodiment of the new reel of the present invention.

DESCRIPTION OF THE DRAWINGS

Referring now to FIG. 1, the new and improved structure of the present invention is incorporated into a closed face spinning reel which generally comprises a front housing cover 10, a rear housing cover 11, a reel frame subassembly 12, a line spool 13, and a notches spinner head 14.

Figure 3:
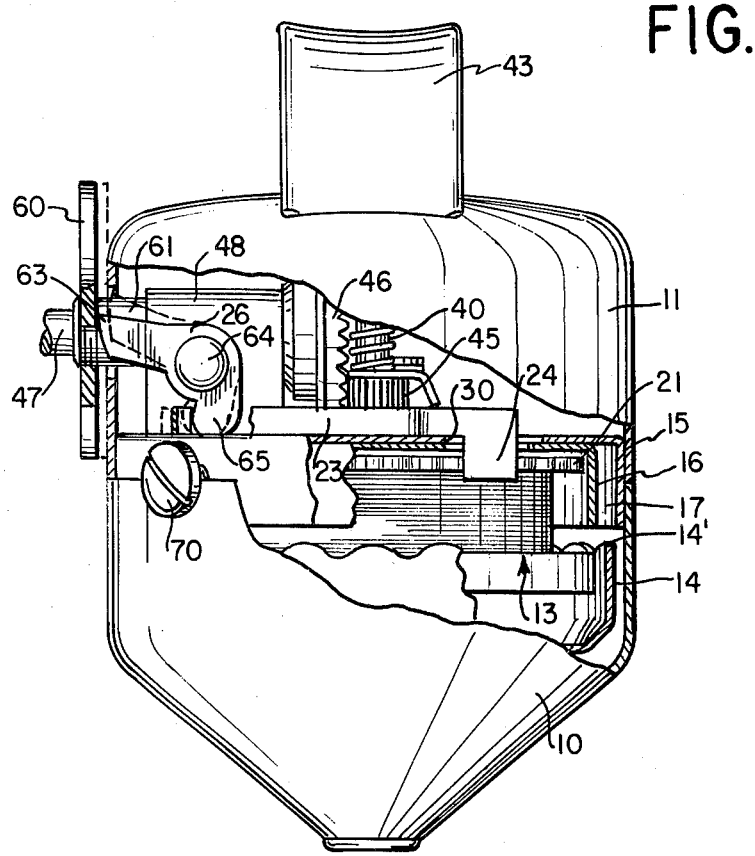
FIG. 3 is a top plan view of the reel with parts broken away to show details of construction.

The reel frame subassembly 12 includes a cylindrical outer member 15 fastened to a cylindrical inner member 16, which two members cooperate to form a forwardly opening annular recess 17 (FIG. 3) into which the rearwardly facing notched edges 14' of the spinner head 14 are received during retrieving. A central hub 18 is fabricated integrally with or otherwise secured to the cylindrical inner member 16 and projects forwardly of the subassembly to seat the bore 19 of the line spool 13 thereupon in known fashion. The line spool is secured to forwardly projecting portions of the hub 18 by a C-clip 20 which snaps into an annular groove formed in the hub (not shown) immediately ahead of the front wall of the spool 13. As is typical in closed face reels of this type, the line spool 13 is normally non-rotatable about the hub 18, however, it is free to slip about the hub when the torque applied thereto (by a hooked fish) exceeds the restraint of a drag brake. Drag braking pressure is applied to the peripheral serrated surface 21 of the rear spool wall 22 by a leaf spring brake lever 23.

The control of the braking pressure applied to the spool 13 through the drag brake 23 represents an important aspect of the present invention. More specifically, the drag brake lever 23, at its upper end, includes a forwardly projecting tab 24, which directly engages the serrated surfaces 21 on the line spool through an opening 30 in the rear wall of the reel frame member 15. At its lower end, the lever includes an arm portion 25, which is engaged by the forward end of a bell crank 26, to be described in more detail hereinafter. The drag brake lever 23 is mounted for pivotal movement on a rotatable hub 27 fastened to the rear wall of the outer cylindrical member 15 by a rivet 28 or the like.

The line casting and retrieval mechanisms of the present invention and the associated anti-reverse mechanism therefor are generally similar to that described in my earlier U.S. Pat. No. 3,489,365. An axially extending main shaft 40 is mounted in the hub 18 for rotation and limited axial displacement. The forward end 41 of the main shaft is threaded and mounts the spinner head 14 thereon, while the rearward end 42 is engageable by the inner surfaces of a thumb button 43 pivotably supported within the rear cover 11 in known fashion. Keyed to the shaft 40 for rotation therewith is a drive gear 45 which is engaged by a gear 46. The gear 46 is mounted on a crank shaft 47, which is journaled for rotation in a bracket 48 fastened by rivets 49 to the outer member 15.

The anti-reverse mechanism 50 includes a control lever 51, a blocking pawl 52, and an actuating member 53, which elements cooperate to prohibit reverse rotation of the main shaft 40 when the anti-reversal mechanism is in its operative condition, as controlled by the position of the lever 51. The blocking pawl 52 may be deactivated by moving the lever 51 into an opposite position. The operation of this type of anti-reverse mechanism is now well known and is described in more detail in my earlier U.S. Pat. No. 3,489,365.

Figure 4:
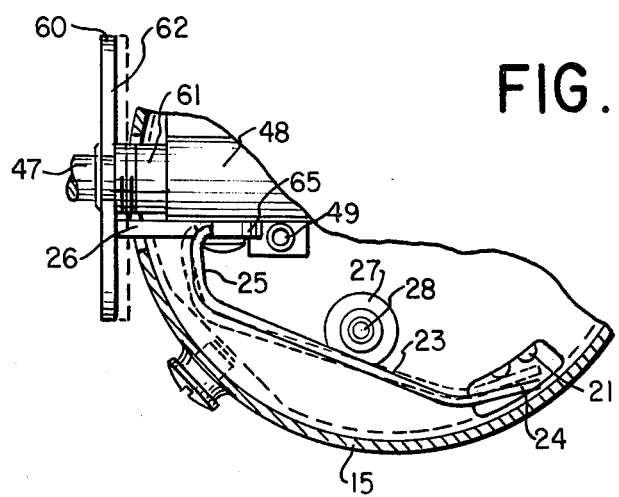
FIG. 4 is a fragmentary, transverse, cross-sectional view of the reel of the invention with parts broken away to show the interrelationship of the clutch control elements.

In accordance with the invention herein, the degree of drag braking pressure applied to the spool 13 through the lever 23 is selectively and precisely controllable through a star wheel 60, which is threaded upon a cylindrical post 61 which projects radially outwardly of the bracket 48. The inner face 62 of the star wheel engages camming portions of the outer leg 63 of the bell crank 26. The bell crank is mounted by a rivet 64 to the bracket 48 for limited pivotal movement in a generally horizontal plane. The inner leg 65 of the bell crank lever 26 engages the bent arm poriton 25 of the drag brake lever 23 (FIG. 4) to stress the lever and consequently to apply drag brake pressure to the serrations 21 of the spool through the drag brake tab 24. Thus, as the star wheel 60 is rotated (clockwise), it drives itself along the threaded end of the post 61, in the nature of a jack screw, toward the reel frame 12. The bell crank will be cammed rearwardly of the reel through leg 63, while the leg 65 of the bell crank will be moved outwardly of the reel frame 12 to pivot the brake lever 23 about the pivot axis of the rivet 28. This will move the tab 24 radially inwardly of the reel frame (indicated in phantom in FIGS. 3 and 4) to increase the pressure applied to the serrations.

Figure 1:
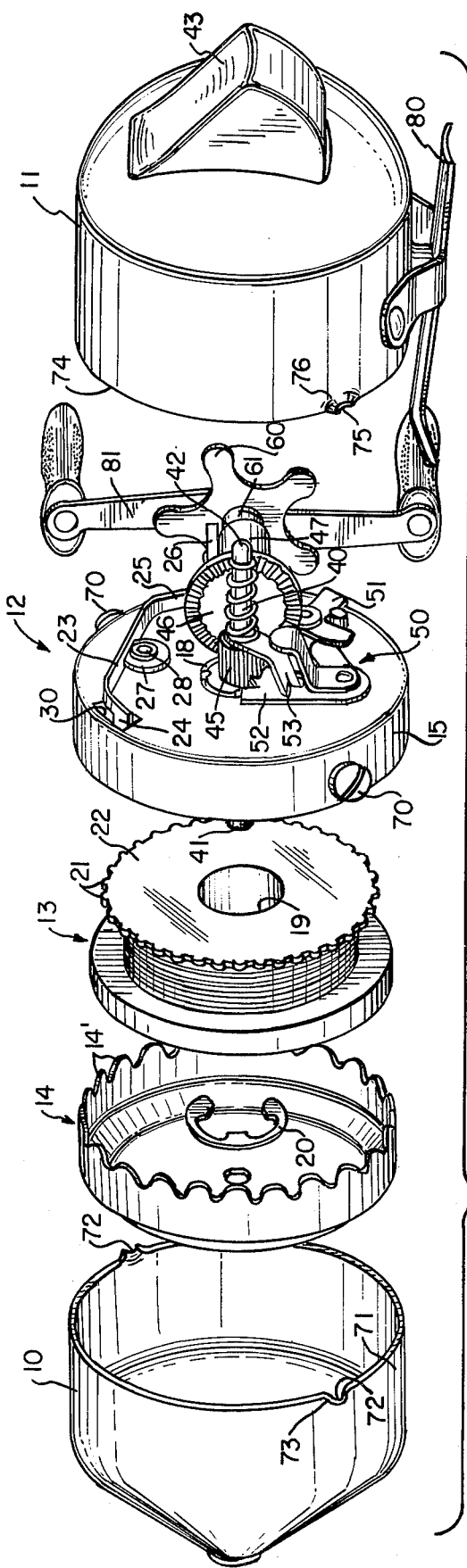
FIG. 1 is an exploded, perspective view of the components of the new and improved closed face spinning reel of the present invention showing the manner in which they are assembled.
Figure 2:
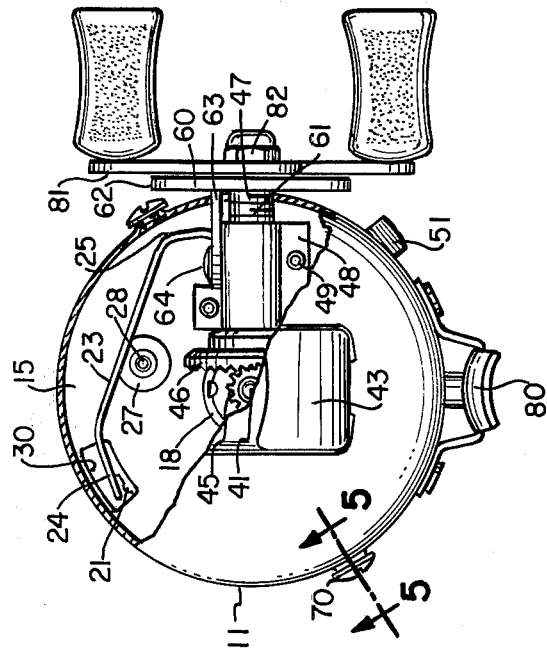
FIG. 2 is a rear elevational view of the reel of the invention with parts broken away to show details of construction.
Figure 5:
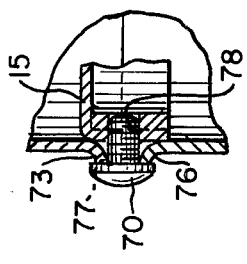
FIG. 5 is an enlarged fragmentary, cross-sectional view taken along line 5—5 of FIG. 2 showing details of the cover assembly.

In accordance with another specific aspect of the invention, the front and rear covers 10, 11 are secured to the reel frame member 15 in edge-to-edge abutting relation by a pair of diametrically opposed locking screws 70 which are threaded into the outer reel frame member 15, as shown best in FIG. 5. More specifically, the front cover 10 is generally cup-shaped and has rearwardly extending cylindrical flanges 71 which define at the edges thereof semi-circular openings 72 having elevated shoulder portions 73. Similarly, the rear cover member 11 has a forwardly extending cylindrical flange 74 which has semi-circular openings 75 formed at the edges thereof, which openings are bounded by shoulders 76. The openings 72, 75 and the shoulders 73, 76 cooperate to define closed circular openings when the flanges of the two cover members are abutted. The underside 77 of the heads of the locking screws 70 are generally concave and define annular grooves which engage and trap the shoulders 73, 76 when the screws 70 are threaded into tapped holes 78 in the reel frame. The grooves 77 lock and retain the covers 10 and 11 in the desired frame relationship, enclosing the reel frame, with the edges of the two covers abutted along their peripheries.

The reel construction of the present invention also includes a tank 80 directly fastened to the rear cover 11 and winding crank handle 81 secured to the free end of the crank shaft 47 by a lock nut 82.

It should be understood that the specific closed face spinning reel structure herein illustrated and described is intended to be representative only, as certain changes may be made therein without departing from the clear teachings of the disclosure. Accordingly, reference should be made to the following appended claims in determining the full scope of the invention.

I claim:

1. In a closed face spinning reel including a cylindrical reel frame body having a transverse circular wall having an opening therein, a spool supported on a hub projecting forwardly of said wall, a main shaft extending axially through the center of said circular wall, a crank drive mechanism mounted in said reel frame for rotating said main shaft, line pickup means carried by the forward end of said main shaft, a front cover means closing off the front face of said reel frame and a rear cover means closing off the rear face of said reel frame, the improvement including a. bracket means extending rearwardly from said transverse wall;
b. a hollow externally threaded post means extending radially outwardly of said bracket means;
c. said crank drive mechanism including crank shaft means disposed perpendicular to said main shaft and supported for rotation within said bracket means and within said post means;
d. said crank shaft means projecting laterally outwardly of said cylindrical frame body to accommodate the mounting thereon of a crank handle;
e. a drag brake lever of resilient leaf spring construction pivotably supported on said transverse wall and having a bent end projecting axially through said opening in said wall and engaging a peripheral portion of said spool, the other end of said lever being adapted to be selectively displaced to vary the drag braking pressure applied by said first end to said spool;

f. a flat star wheel directly threaded to said post means for limited travel therealong;

g. a bell crank pivotably mounted in a plane perpendicular to that of said star wheel;

h. the one end of said bell crank engaging said star wheel and the other end engaging said drag brake lever;

i. whereby selective displacement of said star wheel along said post pivots said bell crank to vary the braking pressure applied to said line spool by the brake lever.

2. The reel of claim 1, in which a. said bracket means includes a flat surface;

b. said bell crank is mounted to said flat surface.

3. The reel of claim 1, in which a. said pickup means includes a cup-shaped spinner head having notched edges; and b. said reel frame is comprised of a pair of nesting members defining a circular groove therebetween for accommodating the notched edges of said pickup head.

4. The reel of claim 1, in which a. said front and rear cover means are fastened to said reel frame in edge-to-edge abutment with one another.

5. A closed face spinning reel comprising a. a central circular reel frame means supporting a line spool, rotatable pickup head, and associated reel control mechanism thereon;

b. said reel frame means having peripheral circumferential flanges projecting axially thereof;

c. locking screws, each threadedly engaged with said reel frame means, having a head portion defining an annular groove at the underside thereof;

d. cup-shaped front and rear covers having annular flanges of predetermined diameter slightly greater than the diameter of said peripheral reel frame flanges;

e. each of said covers including a pair of semi-circular openings defined by semi-circular shoulders;

f. said openings of said front and rear covers forming completely circular openings surrounded by annular shoulders when said front and rear covers are abutted in edge-to-edge relation;

g. whereby said covers may be locked to said reel frame in edge-to-edge abutment through the cooperation of said shoulders with said annular grooves of said locking screws.

6. The reel of claim 5, in which a. said openings are formed on diametrically opposed portions of the flanges of each of said front and rear covers.

* * * * *